July 15, 1958
G. ORLOFF ET AL
2,843,434
SELF VENTING SEALS
Filed Nov. 1, 1954
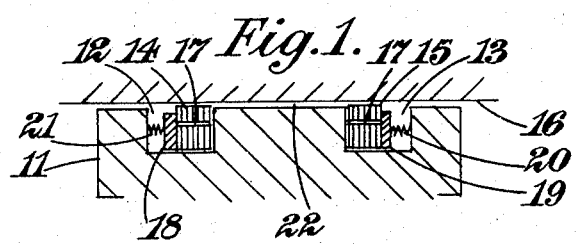
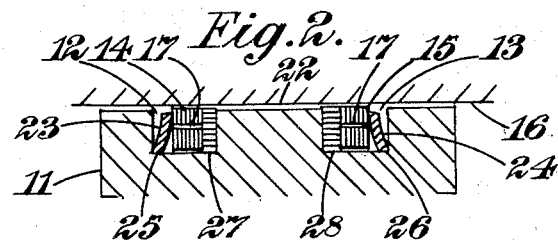
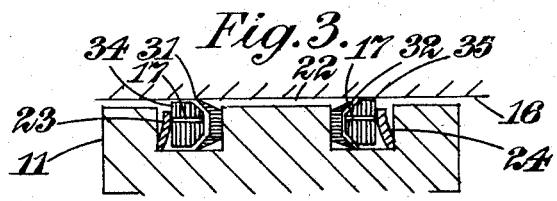
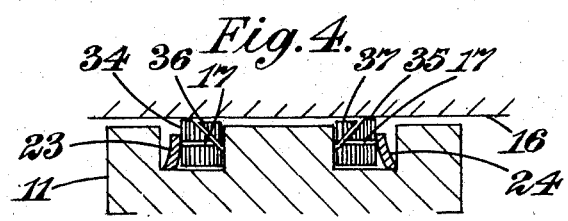
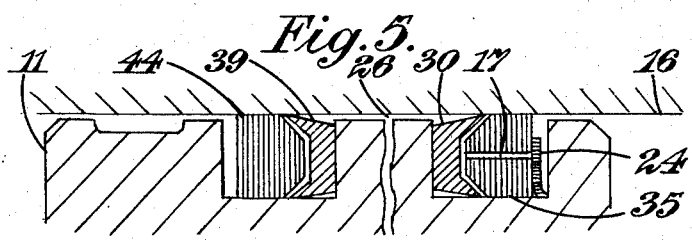
INVENTORS
George Orloff
Bernard C. Smithers
By Watson, Cole, Grindle & Watson
ATTORNEYS United States Patent Office 2,843,434
Patented July 15, 1958

2,843,434
SELF VENTING SEALS

George Orloff and Bernard Charles Smithers, Gloucester, England, assignors to British Messier Limited, Gloucester, England, a British company Application November 1, 1954, Serial No. 466,124

Claims priority, application Great Britain November 13, 1953

10 Claims. (Cl. 309—23)

This invention comprises improvements in or relating to fluid pressure seals for pistons, stuffing boxes and the like.

The invention relates to the type of seal in which two sealing rings of resilient material, such as, for example, synthetic rubber, are located in series in grooves formed in one member of the joint so that they bear against the sliding surface of the other member of the joint. In such seals, one of the sealing rings is forced by pressure on one side of the joint against one face of its groove, and is expanded by a steady pressure, further into contact with the relatively moving wall so producing a tight seal. The other ring seals the joint against pressure in the opposite direction.

It has been found that a pressure build-up occurs in the space between the two sealing rings when there is frequent movement to and fro, and it has been proposed to limit this pressure build-up by venting the space either to atmosphere or in some cases, such as hydro-pneumatic accumulators containing a separator-piston, by venting it through a non-return valve to the oil-pressure space. This is a somewhat complex arrangement, and it is an object of the present invention to avoid vents drilled in the metallic parts, and to enable the build-up of pressure to be avoided in the case where the grooves for the sealing rings have not been specially made or vented.

According to the present invention there is provided in a fluid pressure seal between the surfaces of two members which move relatively one inside the other, a plurality of ring-shaped grooves in the surface of one of said members spaced in the direction of relative movement, a plurality of sealing rings of resilient material one in each of said grooves, which sealing rings are in sealing contact both with the bottoms of the said grooves and with the adjacent surface of the other member and are axially spaced from the sides of said grooves, a vent passage in at least one of said sealing rings leading from the clearance space which is bounded by the said surfaces of the relatively moving members and lies between the rings and means resiliently bearing on the vent passage at the end thereof remote from said space and acting as valve means to permit escape of pressure but to prevent return flow of fluid to the said space between the rings.

In many cases, for example where pressure is exerted continuously against one face of a piston and intermittently against the other, it is found adequate to use a combination of vented and unvented seals, i. e. in the example suggested, to have an unvented seal on the part of the piston nearer the continuous pressure and a vented seal on the part nearer the intermittent pressure.

The following is a description by way of example of certain constructions in accordance with the invention:

In the drawing accompanying the specification:

Figure 1 is a diagrammatic longitudinal section through one edge of a piston working in the cylinder and embodying a construction in accordance with the invention;

Figure 2 is a similar view of a second construction;

Figure 3 is a similar view of a third construction including a backing ring in the form of an extrusion preventer;

Figure 4 is a similar view of a further modification; and

Figure 5 is a view similar to Figures 1 to 4 showing the use of a single vented ring and a single unvented ring in combination with one another.

Referring to Figure 1 the piston 11 is provided with two rectangular grooves, 12, 13 to receive sealing rings 14, 15. The sealing rings are of synthetic rubber and of rectangular cross section and of such dimensions as each to have an interference fit with the base of the groove in which it works and with the wall 16 of the cylinder in which the piston 11 operates. In such conditions under pressure applied on the face of the piston 11 nearest which the ring is situated, it will make a tight joint both on its inner face where it bears on the piston and on its outer face where it bears on the cylinder wall. Each of the rings 14, 15 is of substantially smaller dimensions in an axial direction than the width of the groove in which it works. Each ring has a number of passages 17 through it arranged at intervals around its circumference, which passages extend parallel to the axis of the ring and are located intermediately between the inner and outer faces thereof.

Between each of the rings 14 and 15 and the side of the groove in which it works, which is nearest to the end of the piston, there is inserted a flat valve ring 18 or 19 to bear upon and close the ends of the passages 17. The rings 18, 19 are small enough not to bear on the cylinder surface and their internal bore is large enough not to bind on the piston at the bottom of the groove. They are pressed against the sealing rings 14, 15 by series of light springs 20, 21. While these springs are shown as helical springs they might and preferably would be flat leaf springs.

The effect is that if pressure is exerted on one face of the piston 11 and as a result pressure develops in the space 22 between the two sealing rings 14, 15, this pressure can force the sealing ring 14 or 15, as the case may be, which is nearest to the face of the piston not subject to pressure, away from the side of its groove and the pressure can then pass through the vent passages 17 and lift the valve ring 18 or 19, as the case may be, so that the pressure is relieved. The valve rings 18 and 19 act on non-return valves.

Referring to Figure 2 this shows an alternative and preferred construction of valve ring. In this case the valve rings consist of rubber rings 23, 24 which lie over the passages 17 but are flared as viewed in cross section (somewhat like a Belleville washer) so that their innermost portions 25, 26 press against the bottom outer corners of the grooves 12, 13 and urge the valve rings 23, 24 on to the outlets to the passages 17 without the use of separate springs. This figure also shows behind each of the sealing rings 14, 15 backing rings 27, 28. These backing rings consist of nylon or rubberised fabric or polytetrafluorethylene. Since nylon is not suitable for use at temperatures above about 120° C., polytetrafluorethylene is preferred for use at higher temperatures. These rings 27, 28 which are made of stiffer material than the sealing rings 14, 15 are intended to prevent any tendency to extrusion of the sealing rings into the clearance space 22 between the edge of the piston 11 and the wall 16 of the cylinder.

Referring to Figure 3, this shows a construction similar to that of Figure 2 but the rings of nylon or like material which correspond to the rings 27, 28 are shown as cup-shaped rings 29, 30 which fit against inclined faces 31, 32 on sealing rings 34, 35. The cup-shaped rings 29, 30 constitute extrusion preventers.

Referring to Figure 4, this is similar to Figure 3 but the extrusion preventers consist of narrow triangular rings 36, 37. In other respects the construction is similar to that already described.

Figure 5 shows to a somewhat enlarged scale a construction similar to that of Figure 3 but in this case only the sealing ring 35 is provided with vent passages 17 and the other sealing ring which lies towards the left-hand face of the piston 11, as viewed in the figure, consists of a solid rubber ring 44 and an extrusion preventer 39. In this case the evacuation of fluid under pressure, should this collect in the space 26, can take place only in the direction towards the right-hand face of the piston 11, as viewed in the figure, and if this construction is adopted care must be taken to place the vented ring round the portion of the piston which lies nearest to the face thereof which is periodically subjected only to a low or intermittent pressure.

We claim:

1. In a fluid pressure seal between the surfaces of two members which move relatively one inside the other, a plurality of ring-shaped grooves in the surface of one of said members spaced in the direction of relative movement, a plurality of sealing rings of resilient material one in each of said grooves, which sealing rings are in sealing contact both with the bottoms of the said grooves and with the adjacent surface of the other member and are axially spaced from the sides of said grooves, a vent passage in at least one of said sealing rings leading from the clearance space which is bounded by the said surfaces of the relatively moving members and lies between the rings and means resiliently bearing on the vent passage at the end thereof remote from said space and acting as valve means to permit escape of pressure but to prevent return flow of fluid to the said space between the rings.

2. A seal as claimed in claim 1 wherein the sealing rings are of rubber.

3. A seal as claimed in claim 1 wherein the means resiliently bearing on the vent passages are flat valve rings urged toward the sealing rings by spring pressure.

4. A seal as claimed in claim 1 wherein the valve means consist of rings of flexible material which are non-flat and fit into the ring-shaped grooves so as to press adjacent the bottom of the grooves against the sides of the grooves which face the sealing rings and against the sealing rings.

5. A seal as claimed in claim 1 wherein behind each on the side of each sealing ring remote from its valve means is another ring of harder material shaped to act as an extrusion preventer.

6. A construction as claimed in claim 5 wherein the extrusion preventer consists of a cup-shaped ring.

7. A construction as claimed in claim 5 wherein the extrusion preventer consists of a triangular ring having one face parallel with the said adjacent wall, another face flat to bear on the back of the groove in which it works and a third face inclined to bear upon and receive pressure from the sealing ring.

8. A seal as claimed in claim 5 wherein the backing ring consists of nylon.

9. A seal as claimed in claim 5, wherein the backing ring consists of rubberised fabric.

10. A seal as claimed in claim 5, wherein the backing ring consists of polytetrafluorethylene.

References Cited in the file of this patent

UNITED STATES PATENTS

| | | |
|---|---|---|
| 1,172,337 | Batty | Feb. 22, 1916 |
| 1,778,200 | Nibbs | Oct. 14, 1930 |
| 2,058,674 | Flinchum | Oct. 27, 1936 |
| 2,214,261 | Roth | Sept. 10, 1940 |
| 2,420,104 | Smith | May 6, 1947 |
| 2,494,598 | Waring | Jan. 17, 1950 |
| 2,757,994 | Snyder | Aug. 7, 1956 |